(12) United States Patent
Atchison et al.

(10) Patent No.: US 10,948,213 B2
(45) Date of Patent: Mar. 16, 2021

(54) SYSTEMS AND METHODS FOR OPERATING A THERMOSTAT BASED ON BUILDING CONFIGURATION DATA

(71) Applicant: Johnson Controls Technology Company, Plymouth, MI (US)

(72) Inventors: Shaun B. Atchison, Wichita, KS (US); Theresa N. Gillette, Wichita, KS (US); John W. Uerkvitz, Valley Center, KS (US); Jedidiah O. Bentz, Wichita, KS (US)

(73) Assignee: Johnson Controls Technology Company, Plymouth, MI (US)

( * ) Notice: Subject to any disclaimer, the term of this patent is extended or adjusted under 35 U.S.C. 154(b) by 212 days.

(21) Appl. No.: 15/633,381

(22) Filed: Jun. 26, 2017

(65) Prior Publication Data
US 2018/0031262 A1    Feb. 1, 2018

Related U.S. Application Data

(60) Provisional application No. 62/367,614, filed on Jul. 27, 2016, provisional application No. 62/421,201, filed on Nov. 11, 2016.

(51) Int. Cl.
| | |
|---|---|
| *G05B 15/02* | (2006.01) |
| *F24F 11/62* | (2018.01) |
| *F24F 11/30* | (2018.01) |
| *F24F 11/65* | (2018.01) |
| *F24F 11/56* | (2018.01) |
| *F24F 110/12* | (2018.01) |

(Continued)

(52) U.S. Cl.
CPC .............. *F24F 11/62* (2018.01); *F24F 11/30* (2018.01); *F24F 11/65* (2018.01); *G05B 15/02* (2013.01); *F24F 11/32* (2018.01); *F24F 11/46* (2018.01); *F24F 11/47* (2018.01); *F24F 11/56* (2018.01); *F24F 2110/10* (2018.01); *F24F 2110/12* (2018.01); *F24F 2120/10* (2018.01); *F24F 2120/12* (2018.01); *F24F 2140/60* (2018.01)

(58) Field of Classification Search
None
See application file for complete search history.

(56) References Cited

U.S. PATENT DOCUMENTS

| | | |
|---|---|---|
| 4,942,613 A | 7/1990 | Lynch |
| 6,260,765 B1 | 7/2001 | Natale et al. |

(Continued)

*Primary Examiner* — Bernard G Lindsay
(74) *Attorney, Agent, or Firm* — Foley & Lardner LLP

(57) ABSTRACT

An HVAC system includes HVAC components configured to adjust environmental conditions within a space. A control system is in communication with the HVAC components and is configured to execute in an efficiency operation mode. The efficiency operation mode is configured to receive configuration data related to the space and operational values for the HVAC components, monitor environmental parameters such as outdoor ambient temperature, indoor ambient temperature, and occupancy of the space, monitor an energy usage of the HVAC components based on the current operational values, determine new operational values configured to reduce the energy usage for the HVAC components based on the monitored energy usage and the environmental parameters, and transmit the new operating values to the HVAC components.

26 Claims, 8 Drawing Sheets

(51) Int. Cl.
*F24F 120/12* (2018.01)
*F24F 120/10* (2018.01)
*F24F 11/47* (2018.01)
*F24F 110/10* (2018.01)
*F24F 11/32* (2018.01)
*F24F 11/46* (2018.01)
*F24F 140/60* (2018.01)

(56) References Cited

U.S. PATENT DOCUMENTS

| | | | |
|---|---|---|---|
| 6,438,922 B1* | 8/2002 | DeLeFevre | E04G 9/10 52/741.1 |
| 7,469,550 B2 | 12/2008 | Chapman et al. | |
| 8,620,841 B1 | 12/2013 | Filson et al. | |
| 2004/0249479 A1 | 12/2004 | Shorrock | |
| 2006/0201168 A1 | 9/2006 | Kates | |
| 2007/0045431 A1 | 3/2007 | Chapman et al. | |
| 2009/0266903 A1* | 10/2009 | Fitzgerald | F24F 13/105 236/49.3 |
| 2010/0070234 A1* | 3/2010 | Steinberg | G01K 13/00 702/130 |
| 2012/0252430 A1 | 10/2012 | Imes et al. | |
| 2014/0245770 A1* | 9/2014 | Chen | F25B 29/003 62/238.7 |
| 2014/0262130 A1* | 9/2014 | Yenni | G05B 23/0216 165/11.1 |
| 2014/0262196 A1* | 9/2014 | Frank | F24D 19/1084 165/251 |
| 2014/0316581 A1* | 10/2014 | Fadell | G05D 23/1904 700/276 |
| 2015/0198345 A1* | 7/2015 | Bicknell | G05B 15/02 700/276 |
| 2015/0370927 A1* | 12/2015 | Flaherty | F24F 11/30 703/1 |
| 2016/0377309 A1* | 12/2016 | Abiprojo | G05B 19/042 700/276 |
| 2017/0051958 A1* | 2/2017 | Gao | F25B 49/005 |

* cited by examiner

US 10,948,213 B2

SYSTEMS AND METHODS FOR OPERATING A THERMOSTAT BASED ON BUILDING CONFIGURATION DATA

CROSS-REFERENCE TO RELATED PATENT APPLICATION

This application claims the benefit of and priority to U.S. Provisional Patent Application No. 62/367,614 filed Jul. 27, 2016, and U.S. Provisional Patent Application No. 62/421,201 filed Nov. 11, 2016, the entire disclosures of which are incorporated by reference herein.

BACKGROUND

Heating, ventilation, and air conditioning (HVAC) systems include a control system configured to communicate with both indoor and outdoor components of the HVAC system in order to provide heating or cooling to a building space. The control system may be a centrally controlled thermostat, which a user interacts with to instruct the HVAC components to operate at one or more desired settings. The user often selects the settings for HVAC components via the thermostat and allows the HVAC system to run for extended periods of time at these settings. When the control system operates as such in one mode, there is often excessive energy usage, and user interaction is often required to maintain the desired settings. Additionally, upon installation and maintenance of the HVAC system, the installer must input settings and is often unaware of all aspects of the system, which can lead to installation errors.

SUMMARY

One embodiment of the present disclosure is a heating, ventilating, and air conditioning (HVAC) system. The HVAC system includes HVAC components, such as an indoor unit and an outdoor unit, configured to adjust environmental conditions within a space. The HVAC system includes a control system in communication with the HVAC components which is configured to execute an efficiency operation mode. The efficiency operation mode receives configuration data relating to the space and current operational values for the HVAC components. The configuration data includes one or more of space square footage, space layout, HVAC register locations, and space insulation data. The efficiency operation mode also monitors environmental parameters such as an outdoor ambient temperature, an indoor ambient temperature, and an occupancy of the space. The efficiency operation mode also monitors an energy usage of the HVAC components based on the current operational values. The efficiency operation mode determines new operational values for the HVAC components based on the monitored energy usage and environmental parameters. The new operational values are configured to reduce the energy usage of the HVAC components. The efficiency operation mode then transmits the new operating values to the HVAC components.

Another embodiment of the present disclosure is an HVAC system. The HVAC system includes HVAC components configured to adjust environmental conditions within a space. The HVAC system includes a control system in communication with the HVAC components which is configured to execute a charging operation mode. The charging operation mode receives configuration data related to standard refrigerant charge levels and current operational values for the HVAC components. The charging operation mode also monitors refrigerant charge levels of the HVAC component based on the current operational values. The charging operation mode also monitors refrigerant charge levels of the HVAC components. The charging operation mode then compares the standard refrigerant charge levels to the monitored refrigerant charge levels of the HVAC components.

Another embodiment of the present disclosure relates to a method for reducing energy usage in an HVAC control system in communication with HVAC components. The method includes receiving configuration data related to a space and current operational values of the HVAC components. The configuration data includes one or more of space square footage, space layout, HVAC register locations, and space insulation data. The method also includes monitoring environmental parameters such as an outdoor ambient temperature, an indoor ambient temperature, and an occupancy of the space. The method also includes monitoring an energy usage of the HVAC components based on the current operational values. The method also includes determining new operational values for the HVAC components based on the monitored energy usage and the environmental parameters, where the new operational values are configured to reduce the energy usage of the HVAC components. The method also includes transmitting the new operating values to the HVAC components.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, and specification, systems and methods of configuration modes for an HVAC system are shown, according to various exemplary embodiments. The HVAC control system described herein may be used in any HVAC system, room, environment, or system within which it is desired to control and/or observe environmental conditions (e.g., temperature, humidity, etc.).

The HVAC control systems and methods disclosed herein provide a variety of modes which the user can select from to allow for easier use both by technician and user, reduce energy usage, and to achieve maximum user comfort. Specifically, the control system will operate in modes such as an efficiency mode, a comfort mode, a commissioning mode, a charging mode, and a testing mode. In some modes, the control system may monitor indoor temperature, outdoor temperature, a user presence throughout the space, and energy usage in order to automatically update control system setpoints. Additionally, the HVAC indoor unit and outdoor units will contain additional features to recycle expended energy from the HVAC system and store excess energy in a power source.

Figure 1:
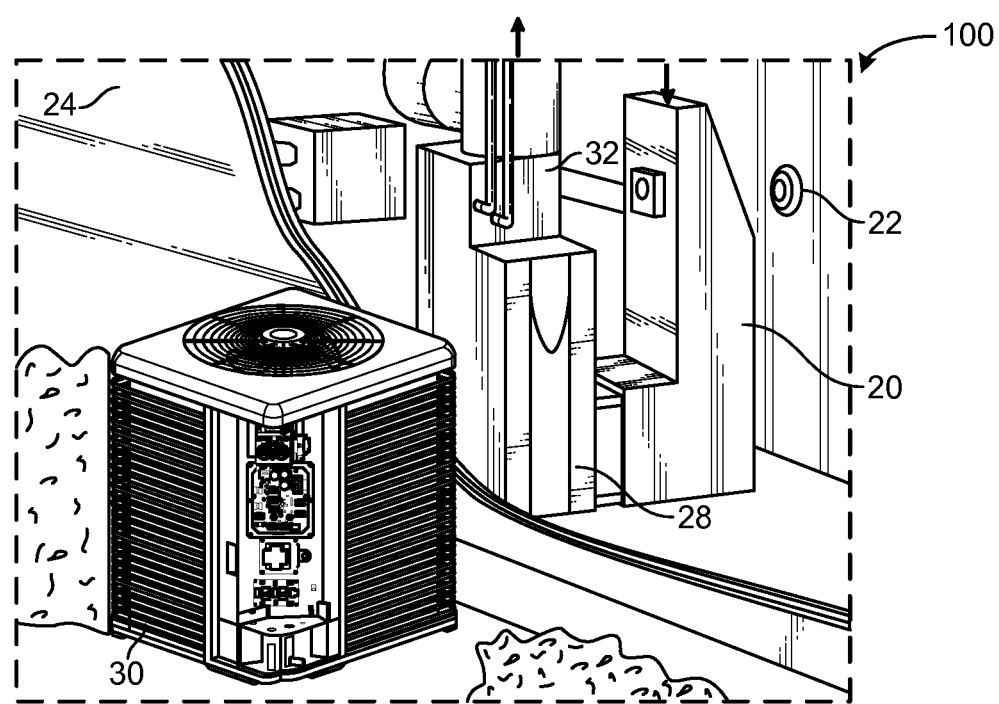
FIG. 1 is a schematic drawing of a building equipped with a heating and cooling system, according to some embodiments.

FIG. 1 illustrates a building equipped with an HVAC system 100. The HVAC system 100 may provide heated and cooled air to a building space 24, as well as provide outside air for ventilation and provide improved air quality (IAQ) through devices such as ultraviolet lights and air filters. In general, a building space 24 will include refrigerant conduits 26 that operatively couple an indoor unit 28 to an outdoor unit 30. Indoor unit 28 may be positioned in a utility space, an attic, a basement, and so forth. Outdoor unit 30 is typically situated adjacent to a side of building space 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the HVAC system 100 shown in FIG. 1 is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides, forces the air through the outer unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through building space 24 by means of ductwork 20. The overall HVAC system 100 operates to maintain a desired temperature as set by thermostat 22. When the temperature sensed inside the building space 24 is higher than the set point on the thermostat 22 (with the addition of a relatively small tolerance), the air conditioner will become operative to refrigerate additional air for circulation through the building space 24. When the temperature reaches the set point (with the removal of a relatively small tolerance), the unit can stop the refrigeration cycle temporarily.

When the unit in FIG. 1 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

The thermostat 22 may provide control signals to control circuits (not shown) configured to control the operation of the indoor and outdoor units 46 and 48. The control circuits may execute hardware or software control algorithms to regulate the HVAC system 100. In some embodiments, the control circuits may include one or more microprocessors, analog to digital converters, non-volatile memories, and interface boards. For example, in response to receiving signals from the thermostat 22, the control circuits may control operations of fans and refrigerant flow control valves of the indoor and outdoor units 46 and 48 to cause more or less warm or cool air to be provided to a building space so as to change the temperature in the building space.

In accordance with the systems and methods disclosed herein, the thermostat 22 is configured to generate sensor signals to be provided to the control circuits based on sensor signals received from various sensors (e.g., temperature sensors and humidity sensors measuring conditions both inside of and outside of a building space), and external server computing systems (e.g., associated with a weather service or a utility company The thermostat 22 may also control the ventilation to the building. For example, the thermostat 22 may control various actuators associated with various dampers in the outdoor unit 30 to control the rates at which inside air is expelled to the exterior of the building or outside air is directed to the interior of the building. Additionally, the thermostat 22 may control the ventilator or amount of air introduced into various zones (e.g., rooms) of the building by controlling various dampers associated with an air supply duct.

Figure 2:
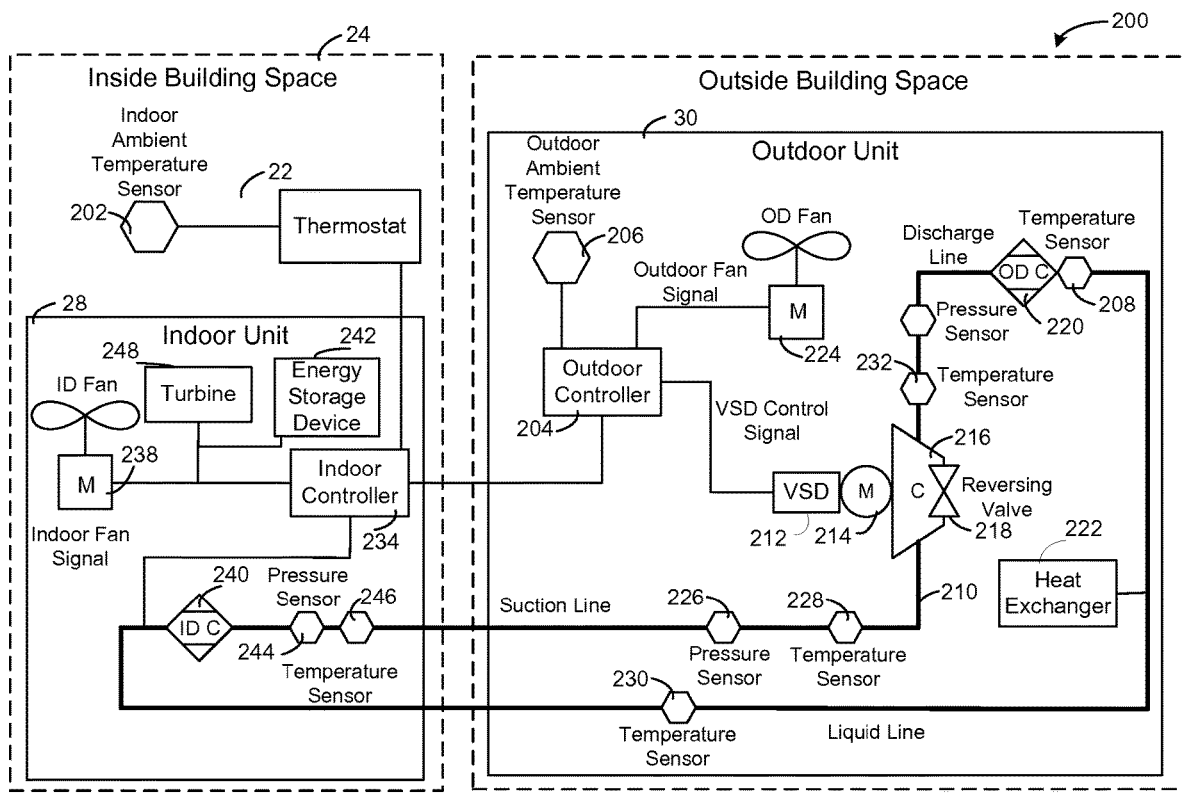
FIG. 2 is a schematic drawing of an indoor unit, an outdoor unit, and a refrigeration line of the heating and cooling system of FIG. 1, according to some embodiments.

Referring now to FIG. 2, the HVAC system 100 is shown according to an exemplary embodiment. Various components of HVAC system 100 are located inside building space 24 while other components are located outside building space 24. Outdoor unit 30, as described with reference to FIG. 1-2, is shown to be located outside building space 24 while indoor unit 28 and thermostat 22, as described with reference to FIG. 1-2, are shown to be located inside building space 24. In various embodiments, the thermostat 22 can cause the indoor unit 28 and the outdoor unit 30 to heat the building space 24. In some embodiments, the thermostat 22 can cause the indoor unit 28 and the outdoor unit 30 to cool the building space 24. In other embodiments, the thermostat 22 can command an airflow change within the building space 24 to adjust the humidity within the building space 24.

Thermostat 22 can be configured to generate control signals for indoor unit 28 and/or outdoor unit 30. The thermostat 22 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 22 may measure the temperature of building space 24 via the indoor ambient temperature sensor 202. Further, the thermostat 22 can be configured to receive the temperature outside building space 24 via communication with the outdoor unit controller 204. In various embodiments, the thermostat 22 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point.

The indoor unit 28 and the outdoor unit 30 may be electrically connected. Further, indoor unit 28 and outdoor unit 30 may be coupled via conduits 210. The outdoor unit 30 can be configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 can be configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 can be configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 22 to determine operating values for components of the HVAC system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate HVAC system 100 as a heat pump or an air conditioner. For example, the outdoor unit controller 204 may cause reversing valve 218 to direct compressed refrigerant to the indoor coil 32 while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of the HVAC system 100.

The outdoor unit controller 204 can be configured to control and/or power outdoor fan 224. The outdoor fan 224 can be configured to blow air over the outdoor coil 220. In this regard, the outdoor unit controller 204 can control the amount of air blowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 can be configured to measure and store the temperatures and pressures of the refrigerant at various locations of the conduits 210. The pressure sensors may be any kind of transducer that can be configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216. Further, the outdoor unit 30 is shown to include pressure sensor 226. The pressure sensor 226 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) can be configured to measure the temperature of the refrigerant at various locations inside conduits 210.

In some embodiments the outdoor unit 30 may include a heat exchanger 222, configured to recycle expended energy from the outdoor unit 30. When the outdoor unit 30 is acting to cool the building, heat is extracted from the refrigerant within conduits 210 in order to cool the refrigerant. The heat exchanger 222 acts to absorb the excess heat. A fluid, such as additional refrigerant, is located within the heat exchanger 222, and is heated up in said process. The heat exchanger 222 acts to deliver this additional refrigerant to heat an additional ancillary component associated with the HVAC system 100. The ancillary component may be part of the HVAC system 100 or may be an additional device used in the building space. In some embodiments, the ancillary components may include water heaters, floor heaters, or reserve water tanks. In other embodiments, the outdoor unit 30 may also include a cooling coil in thermal communication with the heat exchanger 222. When the outdoor unit 30 is acting to heat the building, heat may be extracted from a liquid within the cooling coil and delivered to the refrigerant within conduits 210. The liquid from the cooling coil can then be used with an ancillary component, similar to those described above.

Referring now to the indoor unit 28, the indoor unit 28 is shown to include indoor unit controller 234, indoor electronic expansion valve controller 236, an indoor fan 238, an indoor coil 240, a pressure sensor 244, and a temperature sensor 246.

Indoor unit controller 234 can be configured to control indoor fan 238. The indoor fan 238 can be configured to blow air over indoor coil 32. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 32). In other embodiments, the pressure sensor 244 and/or the temperature sensor 246 may be located on the liquid line (i.e., a predefined distance from indoor coil 32).

In some embodiments, the indoor unit 28 may contain a turbine 248 configured to capture expended energy. The turbine 248 may be placed in a path within the indoor unit 28 wherein the indoor fan 238 blows air past the turbine 248. The turbine 248 is configured to rotate based on the airflow produced by the indoor unit 28 and to generate electrical power based on the rotation. In some embodiments, the power generated by the turbine 248 is stored in an energy storage device contained within the indoor unit 28. The energy storage device may be a battery, a capacitor, a fuel cell, or other energy storage device.

Figure 3:
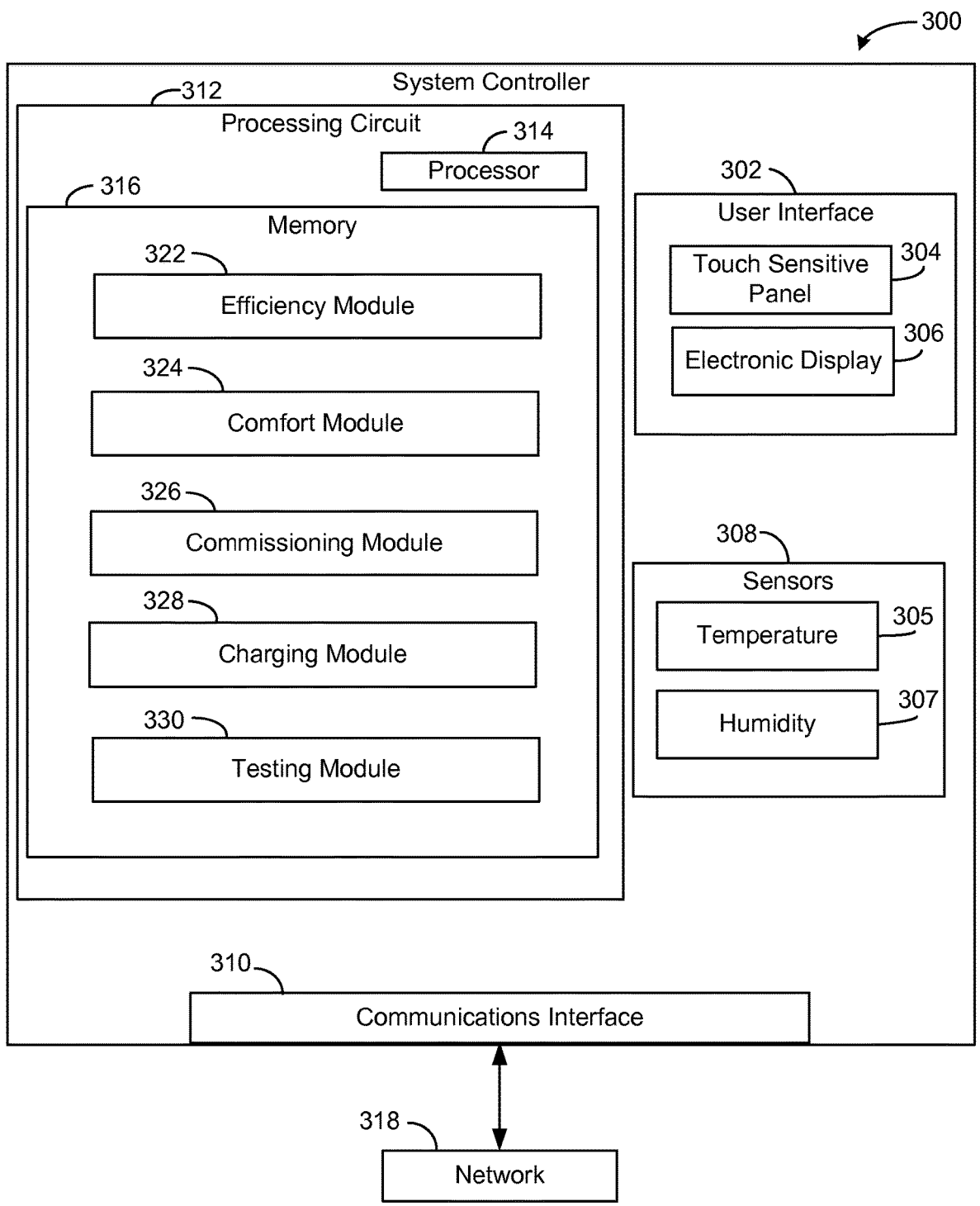
FIG. 3 is a block diagram of the control system of the HVAC system, of FIG. 2, according to some embodiments.

Referring now to FIG. 3, a block diagram illustrating a system controller 300 is shown, according to some embodiments. In one embodiment, the system controller 300 may be thermostat 22. System controller 300 is shown to include a variety of user interface devices 302 and sensors 308. User interface devices 302 may be configured to receive inputs from a user and provide outputs in various forms, and include a touch-sensitive panel 304 and an electronic display 306. It is contemplated that user interface devices 302 may include any type of device configured to receive input from a user and/or provide an output to a user in any of a variety of forms (e.g., touch, text, video, graphics, audio, vibration, etc.).

System controller 300 is shown to include a communications interface 310. The communications interface 310 may include wired and/or wireless interfaces (e.g., jacks, antennas, transmitters, receivers, transceivers, wire terminals, etc.) for conducting data communications with various systems, devices, or networks. For example, the communications interface 310 may include an Ethernet card and port for sending and receiving data via an Ethernet-based communications network and/or a Wi-Fi transceiver for communicating via a wireless communications network. Communications interface 310 may be configured to communicate via local area networks or wide area networks (e.g., the Internet, a building WAN, etc.) and may use a variety of communications protocols (e.g., BACnet, IP, LON, etc.). Communications interface 310 may include a network interface configured to facilitate electronic data communications between the system controller 300 and various external systems or devices (e.g., network 318). In one embodiment, the system controller 300 may communicate operational values of the HVAC system 100 via the network 318 or may access existing operational values from the network 318 using the communications interface 310.

Sensors 308 may be configured to measure a variable state or condition of the environment in which the system controller 300 is installed (e.g., inside the building space 24). Sensors 308 may be integrated into the system controller 300 or be remote and communicate with the system controller 300 (e.g., wirelessly via the communications interface 310 and network 318). In the example shown, the system controller 300 includes the temperature sensor 305 and a humidity sensor 307 for measuring qualities of the air inside the building space 24. In some embodiments, the system controller 300 may also include external temperature and humidity sensors configured to detect conditions outside the building space 24.

The system controller 300 may also include a processing circuit 312. Processing circuit 312 is shown to include a processor 314 and memory 316. Processor 314 may be a general purpose or specific purpose processor, an application specific integrated circuit (ASIC), one or more field programmable gate arrays (FPGAs), a group of processing components, or other suitable processing components. Processor 314 may be configured to execute computer code or instructions stored in memory 316 or received from other computer readable media (e.g., CDROM, network storage, a remote server, etc.).

Memory 316 may include one or more devices (e.g., memory units, memory devices, storage devices, etc.) for storing data and/or computer code for completing and/or facilitating the various processes described in the present disclosure. Memory 316 may include random access memory (RAM), read-only memory (ROM), hard drive storage, temporary storage, non-volatile memory, flash memory, optical memory, or any other suitable memory for storing software objects and/or computer instructions. Memory 316 may include database components, object code components, script components, or any other type of information structure for supporting the various activities and information structures described in the present disclosure. Memory 316 may be communicably connected to processor 314 via processing circuit 312 and may include computer code for executing (e.g., by processor 314) one or more processes described herein. For example, memory 316 is shown to include an efficiency module 322, a comfort module 324, a commissioning module 326, a charging module 328, and a testing module 330. It should be understood that the modules 322, 324, 326, 328, and 330 are executed at the system controller 300. It should be understood that such modules may be executed remotely from the system controller 300 (e.g. at the outdoor unit controller 204 or the indoor unit controller 234 or from a remote device) in accordance with the present disclosure.

A user may select any of the modules 322, 324, 326, 328, and 330 by utilizing the touch-sensitive panel 304 of the user interface 302. Some modules are structured to monitor energy usage of the HVAC system 100. Other modules may instruct the system controller 300 to automatically update setpoint values of both the indoor unit controller 234 and the outdoor unit controller 204 in order to better operate HVAC system 100. Finally, some modules allow a user to access information relating to the HVAC system 100, which may be stored in a database and accessed via the communications interface 310 or may be stored to the memory 316 of the system controller 300.

In one embodiment, the efficiency module 322 acts to reduce energy usage of the HVAC system 100. The user may input one or more preferred setpoint values for the HVAC system 100 to operate at, using the user interface 302. In some embodiments, the efficiency module 322 instructs the system controller 300 to determine projected energy usage based on the user input preferred setpoint values and display this energy usage on the user interface 302. The system controller 300 may calculate other setpoint values associated with lower energy usage and display those setpoint values on the user interface 302. A user may choose to modify the preferred setpoint values to match the calculated setpoint values in order to lower energy usage.

In some embodiment, the efficiency module 322 may be configured to interface with the turbine 248 of the indoor unit 28 to recycle expended energy from the HVAC system 100. The recycled energy may then be stored in the energy storage device 242 of the indoor unit 28. The efficiency module 322 may be configured to direct the energy stored in the energy storage device 242 to the indoor unit 28 and/or the outdoor unit 30 during times of peak energy usage. The efficiency module 322 may further be configured to directly route the energy from the turbine 248 to the HVAC system 100. Further, the efficiency module 322 may further be configured to direct energy from the turbine 248 to the energy storage devices 242. In some embodiments, the efficiency module 322 may further be configured to direct stored heat from the heat exchanger 222 to the HVAC system 100. For example, when additional heating is necessary, the efficiency module 322 may direct stored heated fluid from the heat exchanger to the HVAC system. In other embodiments, the efficiency module 322 may be configured to provide heated fluid from the heat exchanger 222 to one or more ancillary devices, such as water heaters, floor heaters, etc. to reduce the energy consumption of those devices. In other embodiments, the efficiency module 322 may be configured to monitor energy usage of the system 406 and reports said energy usage to a user via the user interface 302, or, via the communications interface 310, allow the user to access the energy usage data remotely.

In one embodiment, the comfort module 324 is configured to provide operational values for the HVAC system 100 based on preferred setpoint values input by the user in order to provide a comfortable environment for the user. The user may input preferred setpoint values for the HVAC system 100 via the user interface 302. The comfort module 324 will determine operational values for the HVAC system 100 based on the user inputs. In some embodiments, the HVAC system 100 will execute a learning behavior, in which the sensors 308 monitor outdoor environmental settings in order to proactively update the operational values to maintain the user preferred setpoint values, as is described in more detail below.

In one embodiment, the commissioning module 326 is configured to provide an easy installation process of the HVAC system 100 for a technician. The commissioning module 326 acts to perform initial setup of all the components of the HVAC system 100 and to perform a systems diagnostics check to ensure proper function of all the components, as is described in more detail below.

In one embodiment, the charging module 328 is configured to provide a way to monitor the refrigerant charge levels throughout the HVAC system 100. The charging module 328 acts to compare monitored refrigerant charge levels of the HVAC system 100 with baseline refrigerant charge levels, which may be stored in the memory 316 or may be accessed via the communications interface 310. The charging module 328 acts to alert the user when the monitored refrigerant charge levels are not within a certain threshold of the baseline refrigerant charge levels, as is described in more detail below.

In one embodiment, the testing module 330 is configured to ensure that the HVAC system 100 operates according to regulatory requirements. During development or manufacture of the HVAC system 100, a technician may utilize the testing module 330 to access regulatory requirements, operate the HVAC system 100 at setpoints according to the regulatory requirements, and ensure proper operation of the HVAC system 100 at these setpoints, as is described in more detail below.

Figure 4:
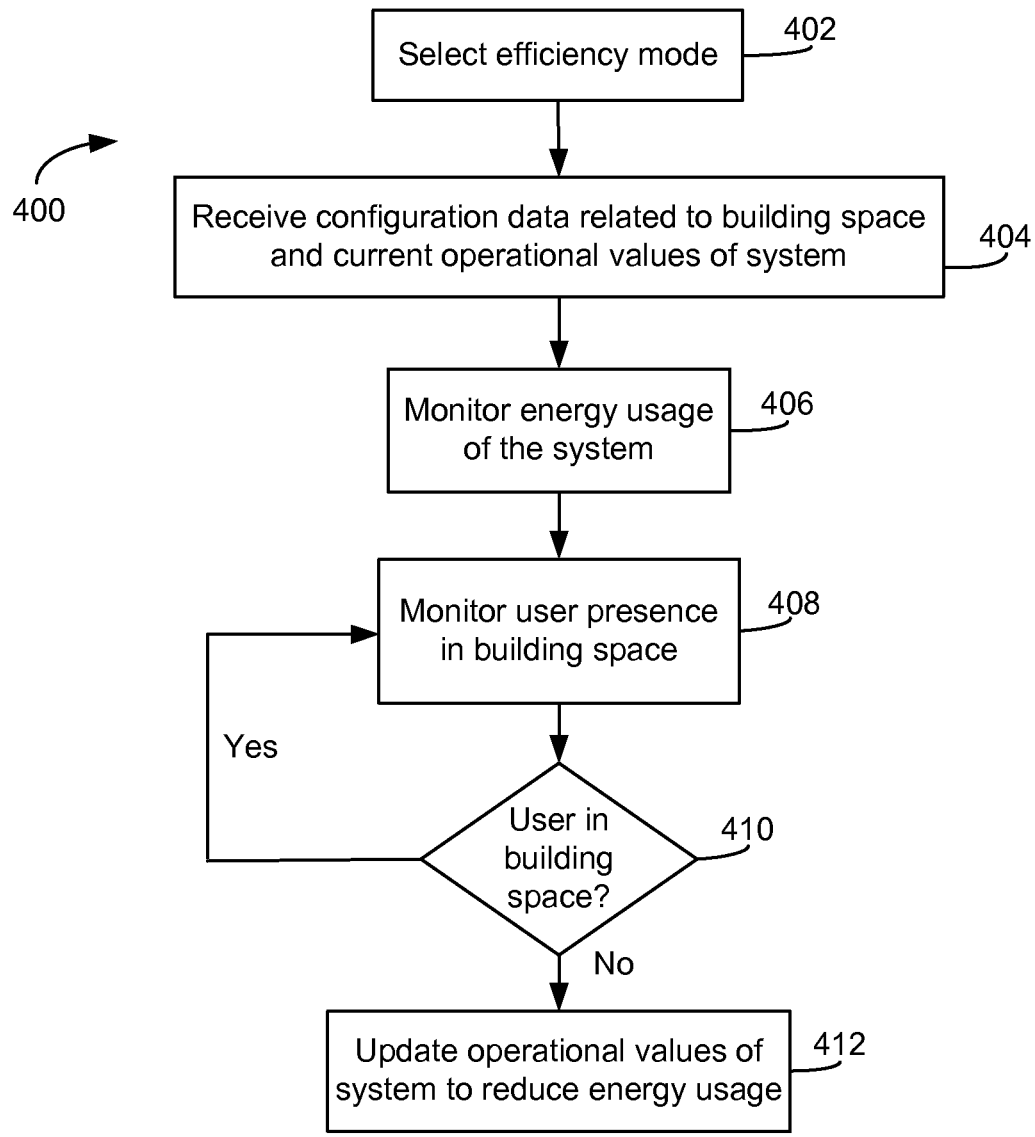
FIG. 4 is a flowchart illustrating an efficiency mode, according to some embodiments.

Referring now to FIG. 4, a flowchart illustrating a process 400 for an efficiency mode is shown, according to some embodiments. In one embodiment, the efficiency module 322 is configured to execute the efficiency mode. The efficiency module 322 acts to reduce energy usage of the HVAC system 100 based on a user occupancy of the building space 24 and by learning typical behavior of the user. At process block 402, the user selects to enter the efficiency mode on the user interface 302 of the system controller 300, or remotely via the network interface 310. At process block 404, the user may input or may automatically access via the communications interface 310 configuration data relating to the building space 24, such as site square footage, site layouts (e.g. architectural drawings), HVAC register locations, ducting schematics, insulation types, window locations, supplementary heating or cooling devices, and the like. The user may further input or automatically access via the communications interface 310, current operational values for the HVAC system 100, such as speeds for both the indoor fan 238 and outdoor fan 224, and the like. At process block 406, the energy usage of the HVAC system 100 is monitored. In one embodiment, at process block 406, the processor 314 estimates the energy usage of the HVAC system 100 based on the configuration data and current operational values. At process block 408, the system controller 300 monitors the building space 24 for occupancy. In one embodiment, the sensors 308 monitor for a user presence throughout the building space 24. For example, the sensors 308 may be configured to detect motion, heat, or sound to determine if the building space 24 is occupied. In some embodiments, the sensors 308 may monitor the building space 24 for specific gasses associated with human occupancy, such as a change in carbon dioxide levels. At process block 410, the system controller 300 determines if the user is present within the building space 24. If the system controller 300 determines that the building space 24 is not occupied, the system controller 300 may automatically update the operational values for the components of the HVAC system 100 to reduce energy usage at process block 412. The system controller 300 then sends these updated operational values to the indoor unit controller 234 and outdoor unit controller 204.

In one example, the system controller 300 may modify the operational values to achieve maximum energy savings when the building space 24 is not occupied. In some embodiments, the system controller 300 may be configured to modify the operational values to provide the maximum amount of energy savings while still not allowing the environmental conditions within the building space 24 to exceed certain values. For example, the system controller 300 may be configured to modify the operational setpoints within a certain range, such as ±ten percent of the user set operational values. However, the range may be more than ten percent or less than ten percent.

Figure 5:
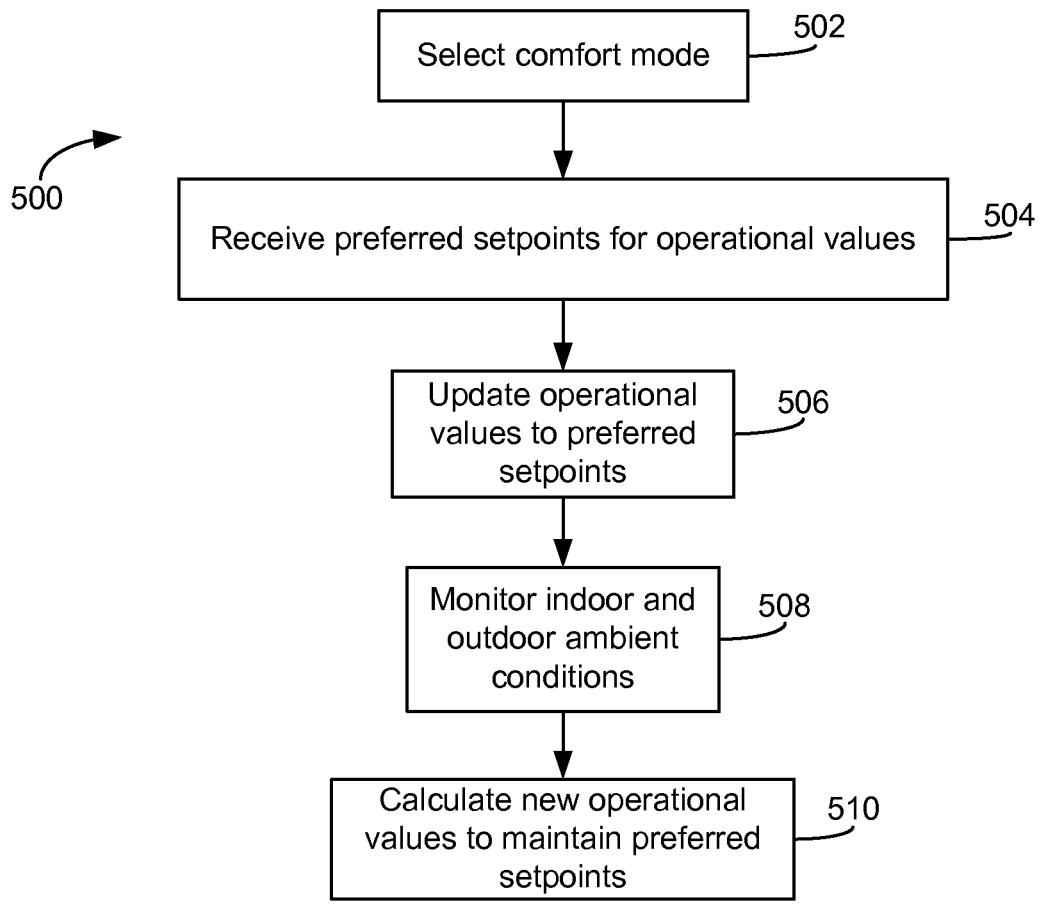
FIG. 5 is a flowchart illustrating a comfort mode, according to some embodiments.

Referring now to FIG. 5, a flowchart illustrating a process 500 for a comfort mode is shown, according to some embodiments. In one embodiment, the comfort module 324 may execute the comfort mode. The comfort mode may be configured to maintain indoor conditions correlating to one or more preferred user setpoints. At process block 502, the user selects to enter the comfort mode on the system controller 300. The user may select the comfort mode using the user interface 302 directly, or remotely via the network interface 310. At process block 504, the user inputs preferred setpoints for operation of the HVAC system 100 in the comfort mode. The user may input the setpoints using the user interface 302, or may access standard setpoints received from the network interface 310. In one embodiment, the standard setpoints may be calculated by the system controller 300 and stored in memory 316. In another embodiment, the standard setpoints may be calculated using the network 318 and may be accessed via the network interface 310 when necessary.

At process block 508, the indoor and outdoor ambient conditions are monitored. In one embodiment, the sensors 308 are used to monitor the indoor ambient conditions and outdoor ambient conditions. Example ambient conditions may include temperature, humidity, sunlight, wind speed, etc. When the sensors 308 detect ambient conditions that do not correlate to the preferred setpoints, the processor 314 calculates new operational values for the HVAC system 100 at process block 510. For example, one or more of the sensors 308 may detect an outdoor ambient temperature that is significantly higher than the user preferred setpoint for temperature inside the building space 24. The processor 314 may automatically lower the preferred setpoint for temperature to maintain an indoor ambient temperature that correlates to the user preferred settings based on the increased outdoor temperature. This can allow the system controller 300 to maintain the indoor ambient temperature at or near the user defined setpoint proactively based on measured outdoor conditions. In other embodiments, the sensors may indicate that sunlight is directed into the building space 24 through one or more windows in the building space 24. The comfort module 324 may increase cooling into the building space 24 to account for the increased temperature from the solar heating. By proactively modifying the operational values of the HVAC system 100, the comfort module 324 can increase user comfort by maintaining the desired comfort levels while dynamically controlling the operational setpoints based on multiple factors, including outdoor environmental conditions.

Figure 6:
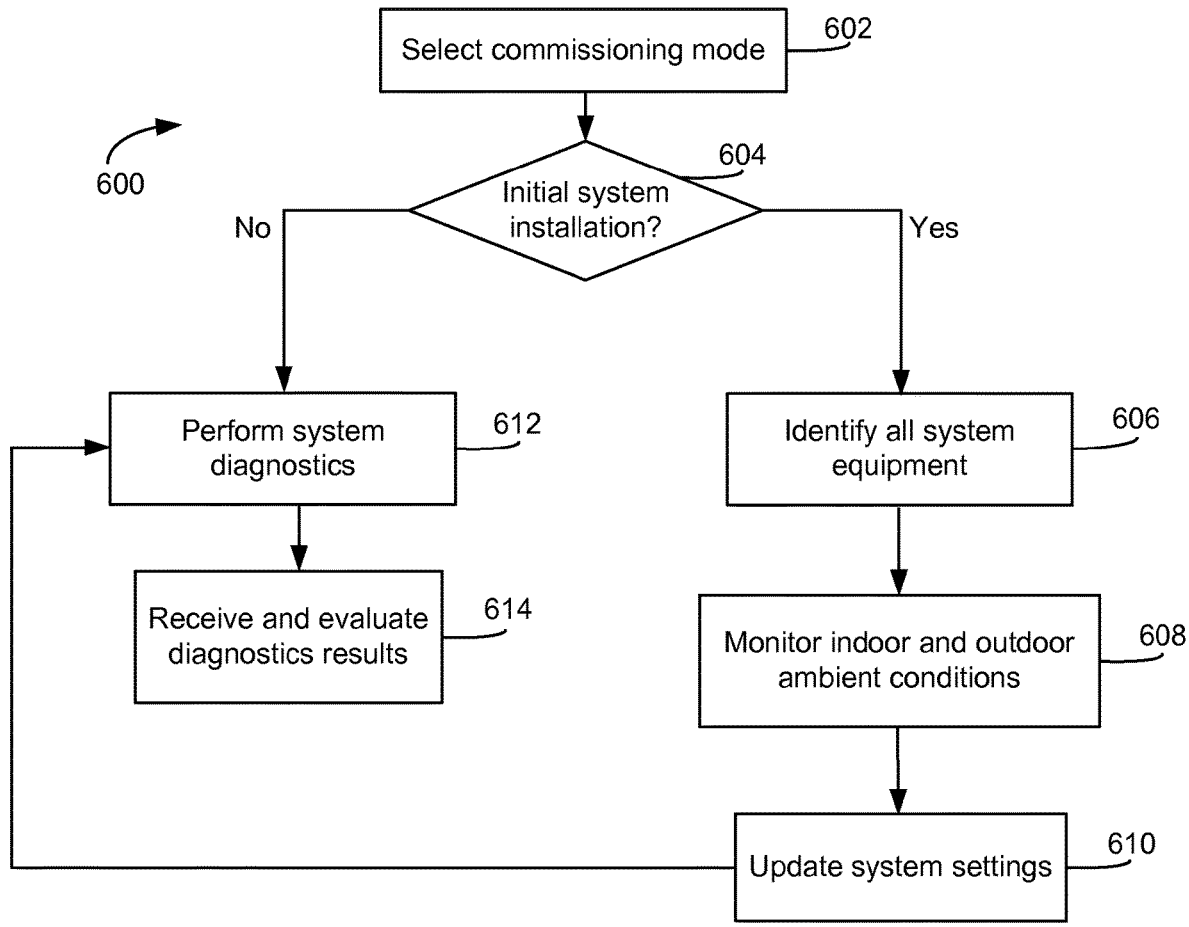
FIG. 6 is a flowchart illustrating a commissioning mode, according to some embodiments.

Referring now to FIG. 6, a flowchart illustrating a process 600 for a commissioning mode is shown, according to some embodiments. In one embodiment, the commissioning module 326 is configured to execute the commissioning mode. The commissioning mode is configured to allows a technician to run a system check to ensure the equipment of the HVAC system 100 is operating correctly during an initial installation. The technician may select the commissioning mode at process block 602. In one embodiment, the technician selects the commissioning mode directly using the user interface 302, or remotely via the network interface 310. At process block 604 the technician provides an indication to the system controller 300 indicating if this is the initial installation of the system. If the technician indicates an initial installation, the system controller 300 identifies all system equipment at process block 606. In one embodiments, the system controller 300 may query all the devices in communication with the system controller 300 to identify the components in the HVAC system 100. The components may respond to the query from the system controller 300 with an identification message. In one embodiment, the technician may input, via the user interface 302, a list of components that are installed in the HVAC system 100. In another embodiment, each of the components may contain a QR code. The technician may scan each QR code using a scanning device to identify all of the components and the system controller 300 may receive this information using the communications interface 310. The QR codes may contain information related to the components such as wiring diagrams, recommended airflow values, jumper settings, and recommended installation settings.

At process block 608, the system controller 300 monitors the ambient conditions inside and outside the building space 24 using the sensors 308 and other components of the HVAC system 100. In one embodiment, the conditions that are monitored include default airflows and pressures within the building space 24, rate of temperature change within the building space 24 during the heating or cooling cycle, and amount of heating coming from a solar unit during the heating cycle. Based on the monitored conditions and the components in use with the HVAC system 100, the HVAC system 100 is updated at process block 610. The memory 316 of the system controller 300 may be updated to store the information in order for the HVAC system 100 to operate more efficiently based on the configuration of the building.

If it is determined at process block 604 that the commissioning mode is being executed after initial installation of the HVAC system 100, a system diagnostic is performed at process block 612. The system diagnostics verifies all components of the system are operating correctly. In one embodiment, the sensors 308 are used to check proper operation of the components such as the indoor unit 28, the outdoor unit 30, and various other accessories which may be in use with the HVAC system 100. The sensors 308 may monitor temperature and humidity to ensure that the HVAC system 100 has correctly modified the conditions within the building space 24. In another embodiment, a technician may verify himself that each component is operating in the correct manner. In other embodiments, the system controller 300 may instruct one or more components of the HVAC system 100 to perform a self-diagnostic check and provide the results to the system controller 300. Information about the components and correct operation may be stored in the memory 316 of the system controller 300 and may be accessed on the user interface 302 or may be stored on the network 318 and may be available using the communications interface 310. At process block 614, the processor evaluates the results of the system diagnostics check and provides the results to the technician using the user interface 302. For example, the user interface 302 will display an alert if a component of the HVAC system 100 is not operating correctly. This can provide a technician with a clear indication of any issues within the HVAC system 100.

Figure 7:
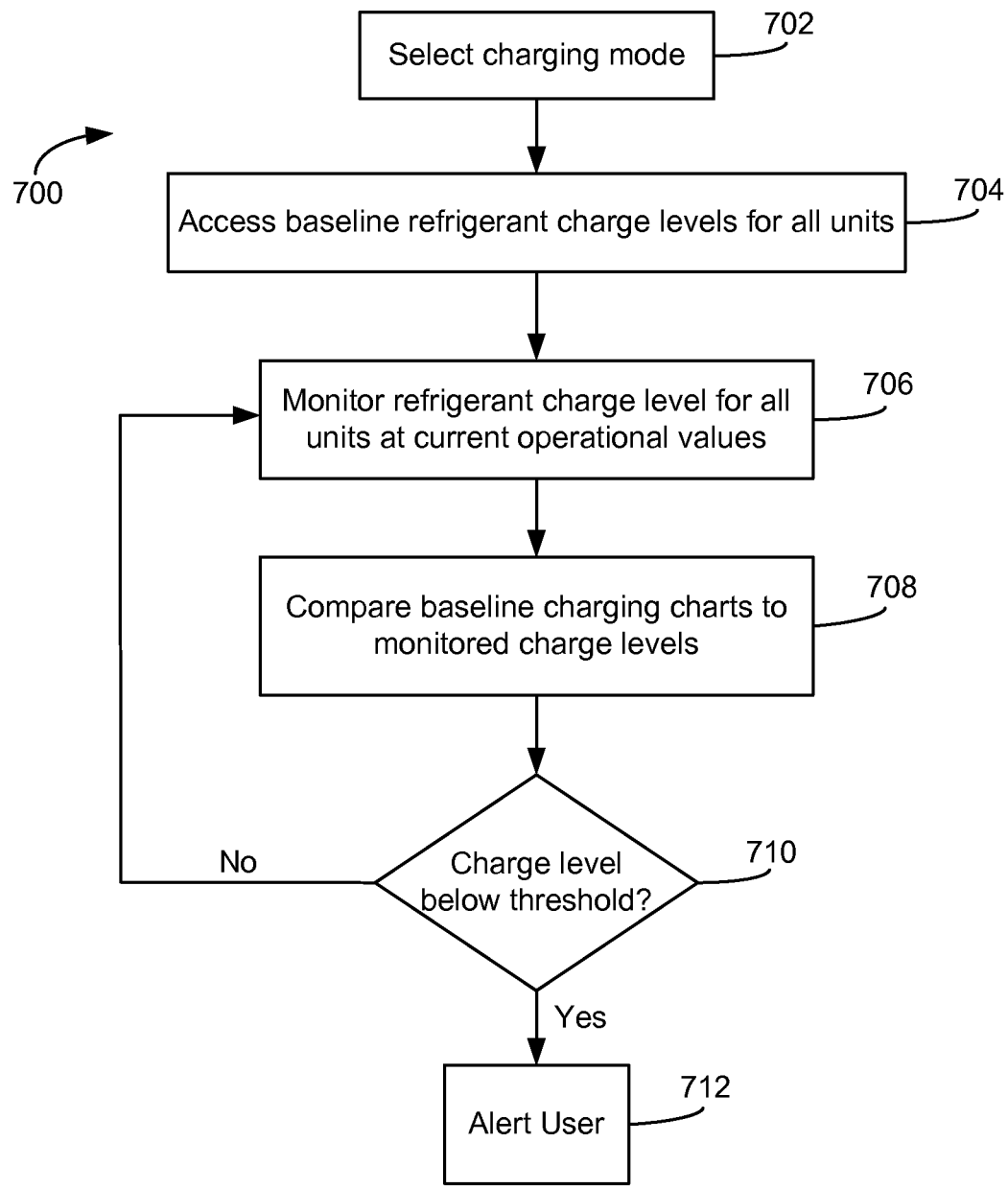
FIG. 7 is a flowchart illustrating a charging mode, according to some embodiments.

Referring now to FIG. 7, a flowchart illustrating a process 700 for a charging mode is shown, according to some embodiments. In one embodiment, the charging module 328 is configured to execute the charging mode. The charging mode is configured to compare current refrigerant charge levels within the HVAC system 100 with baseline refrigerant charge levels. At process block 702, a user or technician initiates the charging mode using the user interface 302 or remotely via the communications interface 310. At process block 704, the baseline refrigerant charge levels are accessed by the system controller 300. The baseline refrigerant charge levels may be a standard of the HVAC system 100, or may be input by a user or technician using the user interface 302 during installation or maintenance of the HVAC system 100. In one embodiment, one or more baseline refrigerant charge levels may be stored in the memory 316 of the system controller 300, or may be stored remotely on the network 318 and accessed via the communications interface 310. At process block 706, the system controller 300 monitors a charge level of refrigerant within the HVAC system 100. At process block 708, the system controller 300 compares the monitored refrigerant charge levels to the accessed baseline refrigerant charge levels. In one embodiment, if the monitored refrigerant charge levels are less than the baseline refrigerant charge levels, at process block 712 the processor 312 may display an alert on the user interface 302 of the system controller 300 to notify a user to add refrigerant to the HVAC system 100 to increase the charge level.

In one embodiment, the baseline charge levels stored in the memory 316 or the network 318 may include additional data points relating to refrigerant charge levels associated with different outdoor weather conditions, which may require different refrigerant charge levels throughout the system. A user may select on the user interface 302 a current outdoor weather situation, or the outdoor weather situation may be detected by the sensors 308. The monitored refrigerant charge level under different outdoor weather conditions is compared to the data point on the baseline refrigerant charge levels for the specific weather condition. In one embodiment, if the current outdoor weather situation consists of extremely low temperatures, an additional data point on the baseline refrigerant charge level may indicate a lower level of charge necessary for the HVAC system 100 to run efficiently in order to prevent false readings due to the refrigerant condensing in cooler temperatures. In another embodiment, if the current outdoor weather situation consists of extremely high temperatures, the amount of refrigerant required for the HVAC system 100 to operate efficiently enough to cool the building space 24 may be greater than in a typical outdoor weather situation. An additional data point on the baseline refrigerant charge level indicating a higher level of charge will be used to compare to the monitored refrigerant charge level. If the monitored refrigerant charge level does not meet the threshold for charge level, the user may be alerted via the user interface 302 to add more refrigerant to the HVAC system 100.

Figure 8:
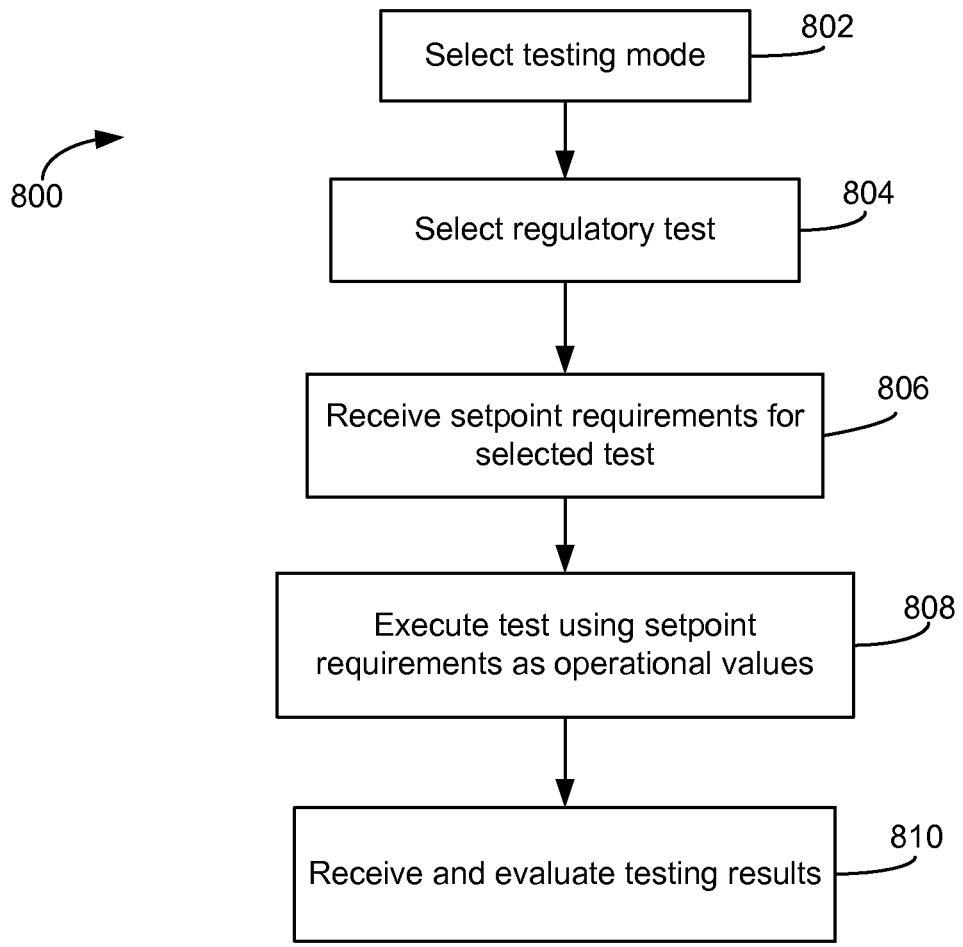
FIG. 8 is a flowchart illustrating a testing mode, according to some embodiments.

Referring now to FIG. 8, a flowchart illustrating a process 800 for a testing mode is shown, according to some embodiments. In one embodiment, the testing module 330 is configured to execute the testing mode. The testing mode may be configured to ensure that the HVAC system 100 meets certain regulatory requirements. Regulatory requirements may include setpoints for the components such as energy usage and fan speeds during normal operation. The testing mode may be used in the development of the HVAC system 100 while still in a laboratory setting to ensure the HVAC system 100 operates at correct standards. Further, in some embodiments, the testing mode may be initiated during the manufacture of the HVAC system 100 to ensure that the HVAC system 100 meets one or more regulatory requirements. Agencies with regulatory requirements for energy usage and relating to HVAC systems may include, but are not limited to, The Department of Energy (DOE), The Air Conditioning, Heating, and Refrigeration Institute, and UL. The testing mode may be selected by a user or technician at process block 802. After the testing mode is selected, at process block 804 the user or technician may select the regulatory testing to be performed. For example, the regulatory testing type may be accessed via the communications interface 310 or by inputting information to the system controller 300 via the user interface 302. At process block 806 the regulatory requirements for the agency are accessed. In one embodiment, the regulatory testing requirements are stored in the memory 316 of the system controller 300. In other embodiments, the regulatory testing requirements are stored in a server-based computing system, and are accessed via the communications interface 310.

At process block 808, the HVAC system 100 is operated using the regulatory requirements to determine the operational setpoints for the various components of the HVAC system 100. The HVAC system 100 may then be operated using the determined operational setpoints, and one or more system parameters are monitored during the operation. At process block 810, the system parameters of the different components of the HVAC system 100 when operating under regulatory requirements are received by the memory 316, and the results are evaluated. In one embodiment, the processor 314 may generate a report based on the operational values when running the system at regulatory requirements. The report may be accessible using the communications interface 310 or displayed on the user interface 302 of the system controller 300. In other embodiments, the monitored system parameters and associated operational setpoints may be provided to the user for analysis.

Although the figures show a specific order of steps for the flowcharts, the order of the steps may differ from what is depicted. Two or more of the modules may be performed concurrently or with partial concurrence. Such variation will depend on the control system, which components of the HVAC system 100 are included within the building space 24, and how the HVAC system 100 is to be used. All such variations are within the scope of the disclosure. The control system may also contain additional modules not disclosed.

What is claimed is:

1. A heating, ventilation, and air conditioning (HVAC) system, the system comprising:
   a plurality of HVAC components configured to adjust an indoor temperature within a space based on a plurality of current operational values, wherein each of the plurality of HVAC components is configured to operate based on one of the plurality of current operational values causing the indoor temperature to move towards a temperature setpoint; and
   a control system in communication with the plurality of HVAC components and configured to:
      execute, in response to a first user selection of a comfort operation mode, in the comfort operation mode by transmitting a plurality of comfort operational values to the plurality of HVAC components causing the plurality of HVAC components to control the indoor temperature to move towards a predefined user preferred temperature setpoint; and
      execute, in response to a second user selection of an efficiency operation mode, in the efficiency operation mode by:
         determining a plurality of new operational values based on one or more window locations within a building and one or more HVAC register locations within the building and updating the plurality of current operational values to the plurality of new operational values for the plurality of HVAC components, wherein the plurality of HVAC components operate to adjust the indoor temperature based on the plurality of new operational values causing the HVAC system to reduce energy usage, wherein each of the plurality of HVAC components operates based on one of the plurality of new operational values; and
transmitting the plurality of new operational values to the plurality of HVAC components.

2. The system of claim 1, wherein the control system is a thermostat.

3. The system of claim 2, wherein the thermostat comprises an interactive user interface.

4. The system of claim 3, wherein the thermostat is configured to cause the plurality of new operational values to be displayed on the interactive user interface.

5. The system of claim 1, wherein the plurality of HVAC components comprise at least an indoor unit configured to produce an airflow and provide the airflow into the space.

6. The system of claim 5, wherein the indoor unit further comprises a turbine positioned within an airflow path of the indoor unit and configured to rotate based on the airflow produced by the indoor unit, the turbine further configured to generate power based on rotation of the turbine.

7. The system of claim 6, further comprising an energy storage device, wherein the energy storage device is configured to store energy based on the power.

8. The system of claim 7, wherein the energy storage device is one or more of a battery, a capacitor, and a fuel cell.

9. The system of claim 1, wherein the plurality of HVAC components further comprise an outdoor unit, wherein the outdoor unit comprises at least a heat exchanger and one or more of a heat capture device and a cooling coil.

10. The system of claim 9, wherein the heat capture device is configured to capture heat exchanged by the outdoor unit, and to provide the heat to an additional ancillary component of the space associated with the HVAC system.

11. The system of claim 10, wherein the additional ancillary component associated with the HVAC system is one or more of a water heater, floor heater, and water tank.

12. The system of claim 1, wherein the control system is configured to receive data from the scanning of a QR code located on one or more of the plurality of HVAC components.

13. The system of claim 12, wherein the data received is one of a wiring diagram, recommended airflow values, jumper settings, and recommended install settings.

14. The system of claim 1, wherein the control system is further configured to execute a charging mode, configured to:
receive predefined charge levels for the plurality of HVAC components;
monitor charge levels of the plurality of HVAC components based on the plurality of current operational values; and
compare the predefined charge levels to charge levels of the plurality of HVAC components.

15. The system of claim 14, wherein the predefined charge levels relate to a level of refrigerant utilized in the plurality of HVAC components.

16. The system of claim 14, wherein the predefined charge levels for the plurality of HVAC components relate to one or more of an indoor unit and an outdoor unit.

17. The system of claim 1, wherein the control system is further configured to execute a testing mode, the testing mode configured to:
receive required operating values based on one or more predefined requirements;
transmit the required operating values to the plurality of HVAC components; and
monitor the energy usage of the plurality of HVAC components and one or more environmental parameters based on the required operating values.

18. The system of claim 17, wherein the one or more predefined requirements are established by one or more of The Department of Energy, The Air Conditioning, Heating, and Refrigeration Institute, and UL.

19. The system of claim 17, wherein the control system is further configured to execute a commissioning mode, the commissioning mode configured to:
identify the plurality of HVAC components;
monitor one or more conditions within the space, wherein the one or more conditions comprise one or more of default airflows, default pressures, and rate of temperature change within the space; and
store the one or more conditions to a memory of the control system.

20. The system of claim 1, wherein the plurality of HVAC components comprise an indoor fan and an outdoor fan, wherein the plurality of current operational values comprise a current indoor fan speed and a current outdoor fan speed;
wherein the plurality of new operational values comprise a new indoor fan speed for the indoor fan and a new outdoor fan speed for the outdoor fan.

21. The HVAC system of claim 1, wherein the control system is further configured to execute a commissioning mode for an initial installation of the plurality of HVAC components, the commissioning mode configured to:
identify the plurality of HVAC components;
monitor a rate of temperature change within the space caused by operation of at least some of the plurality of HVAC components; and
update one or more operating settings of the plurality of HVAC components.

22. A method for reducing energy usage in a heating ventilation, and air conditioning (HVAC) control system in communication with a plurality of HVAC components, the method comprising:
executing, in response to a first user selection of a comfort operation mode, in the comfort operation mode by transmitting a plurality of comfort operational values to the plurality of HVAC components causing the plurality of HVAC components to control an indoor temperature to move towards a predefined user preferred temperature setpoint; and
executing, in response to a second user selection of an efficiency operation mode, in the efficiency operation mode by:
determining a plurality of new operational values based on configuration data comprising one or more window locations within a building and one or more HVAC register locations within the building; and
updating a plurality of current operational values to the plurality of new operational values for the plurality of HVAC components, wherein the plurality of HVAC components operate to adjust the indoor temperature based on the plurality of new operational values causing the plurality of HVAC components to reduce the energy usage of the plurality of HVAC components, wherein each of the plurality of HVAC components operates based on one of the plurality of new operational values.

23. The method of claim 22, wherein the configuration data received is site square footage.

24. A heating, ventilation, and air conditioning (HVAC) system, the system comprising:

one or more HVAC components configured to adjust one or more environmental conditions within a space; and
a control system in communication with the one or more HVAC components configured to control the one or more HVAC components and configured to:
  execute, in response to a first user selection of a comfort operation mode, in the comfort operation mode by transmitting a plurality of comfort operational values to the one or more HVAC components causing the one or more HVAC components to control an indoor temperature to move towards a predefined user preferred temperature setpoint;
  execute, in response to a second user selection of an efficiency operation mode, in the efficiency operation mode by determining a plurality of new operational values based on one or more window locations within a building and one or more HVAC register locations within the building and transmitting the plurality of new operational values to the one or more HVAC components, wherein the one or more HVAC components operate to adjust the indoor temperature based on the plurality of new operational values causing the HVAC system to reduce energy usage; and
  execute in a charging operation mode causing the control system to:
    receive configuration data related to predefined charge levels and one or more current operational values related to the one or more HVAC components;
    monitor a charge level of the one or more HVAC components based on the one or more current operational values;
    compare the predefined charge levels to the charge level of the one or more HVAC components; and
    notify a user if the charge level of the one or more HVAC components is not within a specified range of the predefined charge levels.

25. The system of claim 24, wherein the configuration data includes data points for a plurality of outdoor environmental conditions.

26. The system of claim 24, wherein the control system is further configured to execute the efficiency operation mode causing the control system to:
  receive data related to the space comprising one or more of space square footage, space layout, and space insulation data, and further receive the one or more current operational values for the one or more HVAC components;
  monitor one or more environmental parameters, wherein the one or more environmental parameters comprise one or more of an outdoor ambient temperature, the indoor temperature, and an occupancy of the space;
  monitor the energy usage based on the one or more current operational values, the energy usage associated with the one or more HVAC components;
  determine one or more new operational values for the one or more HVAC components based on the energy usage and the one or more environmental parameters, wherein the one or more new operational values are configured to reduce the energy usage of the one or more HVAC components; and
  transmit the one or more new operational values to the one or more HVAC components.

\* \* \* \* \*